US010769393B2

(12) United States Patent
Tao et al.

(10) Patent No.: US 10,769,393 B2
(45) Date of Patent: Sep. 8, 2020

(54) CHIP ON BOARD BASED HIGHLY INTEGRATED IMAGER

(71) Applicant: Honeywell International Inc., Fort Mill, SC (US)

(72) Inventors: Xi Tao, Suzhou (CN); Yong Liu, Suzhou (CN); Taylor Smith, Charlotte, NC (US); Ynjiun Paul Wang, Cupertino, CA (US)

(73) Assignee: HONEYWELL INTERNATIONAL INC., Fort Mill, SC (US)

( * ) Notice: Subject to any disclaimer, the term of this patent is extended or adjusted under 35 U.S.C. 154(b) by 270 days.

(21) Appl. No.: 15/240,292

(22) Filed: Aug. 18, 2016

(65) Prior Publication Data

US 2016/0358000 A1 Dec. 8, 2016

Related U.S. Application Data

(63) Continuation of application No. 14/062,239, filed on Oct. 24, 2013, now Pat. No. 9,424,454.

(30) Foreign Application Priority Data

Oct. 24, 2012 (CN) .......................... 2012 1 0411590

(51) Int. Cl.
*G06K 7/10* (2006.01)
*G06K 7/015* (2006.01)
(Continued)

(52) U.S. Cl.
CPC ......... *G06K 7/10722* (2013.01); *G06K 7/015* (2013.01); *G06K 7/10821* (2013.01);
(Continued)

(58) Field of Classification Search
CPC ........................... G06K 7/10722; G06K 7/015
(Continued)

(56) References Cited

U.S. PATENT DOCUMENTS 5,363,202 A 11/1994 Udagawa et al.
6,381,030 B1 4/2002 Udagawa et al.
(Continued)

FOREIGN PATENT DOCUMENTS

CN 1391680 A 1/2003
CN 1832212 A 9/2006
(Continued)

OTHER PUBLICATIONS

First Office Action in related Chinese Application No. 201210411590.8 dated Sep. 4, 2017, pp. 1-8 [U.S. Pub. No. 2007/0040034 previously cited.]
(Continued)

*Primary Examiner* — Michael G Lee
*Assistant Examiner* — David Tardif
(74) *Attorney, Agent, or Firm* — Alston & Bird LLP

(57) ABSTRACT

An apparatus for use in decoding a bar code symbol may include an image sensor integrated circuit having a plurality of pixels, timing, and control circuitry for controlling an image sensor, gain circuitry for controlling gain, and analog to digital conversion circuitry for conversion of an analog signal to a digital signal. The apparatus may also include a PCB for mounting the image sensor integrated circuit and light source bank. The connection between the image sensor integrated circuit and/or light source bank and the PCB characterized by a plurality of wires connecting a plurality of bond pads and a plurality of contact pads, where the wires, bond pads, and contact pads provide electrical input/output and mechanical connections between the image sensor integrated circuit and the PCB. The apparatus may be operative for processing image signals generated by the image sensor integrated circuit for attempting to decode the bar code symbol.

20 Claims, 4 Drawing Sheets

1212 1210 200 300 1202 1208 1200 1206 1204 500 1040 900

(51) Int. Cl.
*H04N 5/225* (2006.01)
*G06K 7/14* (2006.01)

(52) U.S. Cl.
CPC ..... *G06K 7/10831* (2013.01); *G06K 7/10851* (2013.01); *G06K 7/1413* (2013.01); *H04N 5/2251* (2013.01); *H04N 5/2253* (2013.01); *H04N 5/2257* (2013.01)

(58) Field of Classification Search
USPC ..................................................... 235/462.21
See application file for complete search history.

(56) References Cited

U.S. PATENT DOCUMENTS 6,388,767 B1 5/2002 Udagawa et al.
6,832,725 B2 12/2004 Gardiner et al.
7,097,101 B2 8/2006 Kogan et al.
7,128,266 B2 10/2006 Marlton et al.
7,159,783 B2 1/2007 Walczyk et al.
7,270,274 B2 9/2007 Hennick et al.
7,279,782 B2 10/2007 Yang et al.
7,296,751 B2 11/2007 Barber et al.
7,413,127 B2 8/2008 Ehrhart et al.
7,500,614 B2 3/2009 Barber et al.
7,726,575 B2 6/2010 Wang et al.
8,294,969 B2 10/2012 Plesko
8,317,105 B2 11/2012 Kotlarsky et al.
8,322,622 B2 12/2012 Suzhou et al.
8,366,005 B2 2/2013 Kotlarsky et al.
8,371,507 B2 2/2013 Haggerty et al.
8,376,233 B2 2/2013 Van Horn et al.
8,381,979 B2 2/2013 Franz
8,390,909 B2 3/2013 Plesko
8,408,464 B2 4/2013 Zhu et al.
8,408,468 B2 4/2013 Horn et al.
8,408,469 B2 4/2013 Good
8,424,768 B2 4/2013 Rueblinger et al.
8,448,863 B2 5/2013 Xian et al.
8,457,013 B2 6/2013 Essinger et al.
8,459,557 B2 6/2013 Havens et al.
8,469,272 B2 6/2013 Kearney
8,474,712 B2 7/2013 Kearney et al.
8,479,992 B2 7/2013 Kotlarsky et al.
8,490,877 B2 7/2013 Kearney
8,517,271 B2 8/2013 Kotlarsky et al.
8,523,076 B2 9/2013 Good
8,528,818 B2 9/2013 Ehrhart et al.
8,544,737 B2 10/2013 Gomez et al.
8,548,420 B2 10/2013 Grunow et al.
8,550,335 B2 10/2013 Samek et al.
8,550,354 B2 10/2013 Gannon et al.
8,550,357 B2 10/2013 Kearney
8,556,174 B2 10/2013 Kosecki et al.
8,556,176 B2 10/2013 Van Horn et al.
8,556,177 B2 10/2013 Hussey et al.
8,559,767 B2 10/2013 Barber et al.
8,561,895 B2 10/2013 Gomez et al.
8,561,903 B2 10/2013 Sauerwein
8,561,905 B2 10/2013 Edmonds et al.
8,565,107 B2 10/2013 Pease et al.
8,571,307 B2 10/2013 Li et al.
8,579,200 B2 11/2013 Samek et al.
8,583,924 B2 11/2013 Caballero et al.
8,584,945 B2 11/2013 Wang et al.
8,587,595 B2 11/2013 Wang
8,587,697 B2 11/2013 Hussey et al.
8,588,869 B2 11/2013 Sauerwein et al.
8,590,789 B2 11/2013 Nahill et al.
8,596,539 B2 12/2013 Havens et al.
8,596,542 B2 12/2013 Havens et al.
8,596,543 B2 12/2013 Havens et al.
8,599,271 B2 12/2013 Havens et al.
8,599,957 B2 12/2013 Peake et al.
8,600,158 B2 12/2013 Li et al.
8,600,167 B2 12/2013 Showering
8,602,309 B2 12/2013 Longacre et al.
8,608,053 B2 12/2013 Meier et al.
8,608,071 B2 12/2013 Liu et al.
8,611,309 B2 12/2013 Wang et al.
8,615,487 B2 12/2013 Gomez et al.
8,621,123 B2 12/2013 Caballero
8,622,303 B2 1/2014 Meier et al.
8,628,013 B2 1/2014 Ding
8,628,015 B2 1/2014 Wang et al.
8,628,016 B2 1/2014 Winegar
8,629,926 B2 1/2014 Wang
8,630,491 B2 1/2014 Longacre et al.
8,635,309 B2 1/2014 Berthiaume et al.
8,636,200 B2 1/2014 Kearney
8,636,212 B2 1/2014 Nahill et al.
8,636,215 B2 1/2014 Ding et al.
8,636,224 B2 1/2014 Wang
8,638,806 B2 1/2014 Wang et al.
8,640,958 B2 2/2014 Lu et al.
8,640,960 B2 2/2014 Wang et al.
8,643,717 B2 2/2014 Li et al.
8,646,692 B2 2/2014 Meier et al.
8,646,694 B2 2/2014 Wang et al.
8,657,200 B2 2/2014 Ren et al.
8,659,397 B2 2/2014 Vargo et al.
8,668,149 B2 3/2014 Good
8,678,285 B2 3/2014 Kearney
8,678,286 B2 3/2014 Smith et al.
8,682,077 B1 3/2014 Longacre
D702,237 S 4/2014 Oberpriller et al.
8,687,282 B2 4/2014 Feng et al.
8,692,927 B2 4/2014 Pease et al.
8,695,880 B2 4/2014 Bremer et al.
8,698,949 B2 4/2014 Grunow et al.
8,702,000 B2 4/2014 Barber et al.
8,717,494 B2 5/2014 Gannon
8,720,783 B2 5/2014 Biss et al.
8,723,804 B2 5/2014 Fletcher et al.
8,723,904 B2 5/2014 Marty et al.
8,727,223 B2 5/2014 Wang
8,736,909 B2 5/2014 Sato et al.
8,740,082 B2 6/2014 Wilz
8,740,085 B2 6/2014 Furlong et al.
8,743,275 B1 6/2014 Han
8,746,563 B2 6/2014 Hennick et al.
8,750,445 B2 6/2014 Peake et al.
8,752,766 B2 6/2014 Xian et al.
8,756,059 B2 6/2014 Braho et al.
8,757,495 B2 6/2014 Qu et al.
8,760,563 B2 6/2014 Koziol et al.
8,763,909 B2 7/2014 Reed et al.
8,777,108 B2 7/2014 Coyle
8,777,109 B2 7/2014 Oberpriller et al.
8,779,898 B2 7/2014 Havens et al.
8,781,520 B2 7/2014 Payne et al.
8,783,573 B2 7/2014 Havens et al.
8,789,757 B2 7/2014 Barten
8,789,758 B2 7/2014 Hawley et al.
8,789,759 B2 7/2014 Xian et al.
8,794,520 B2 8/2014 Wang et al.
8,794,522 B2 8/2014 Ehrhart
8,794,525 B2 8/2014 Amundsen et al.
8,794,526 B2 8/2014 Wang et al.
8,798,367 B2 8/2014 Ellis
8,807,431 B2 8/2014 Wang et al.
8,807,432 B2 8/2014 Van Horn et al.
8,820,630 B2 9/2014 Qu et al.
8,822,848 B2 9/2014 Meagher
8,824,692 B2 9/2014 Sheerin et al.
8,824,696 B2 9/2014 Braho
8,842,849 B2 9/2014 Wahl et al.
8,844,822 B2 9/2014 Kotlarsky et al.
8,844,823 B2 9/2014 Fritz et al.
8,849,019 B2 9/2014 Li et al.
D716,285 S 10/2014 Chaney et al.
8,851,383 B2 10/2014 Yeakley et al.
8,854,633 B2 10/2014 Laffargue
8,866,963 B2 10/2014 Grunow et al.

(56) References Cited

U.S. PATENT DOCUMENTS 8,868,421 B2 10/2014 Braho et al.
8,868,519 B2 10/2014 Maloy et al.
8,868,802 B2 10/2014 Barten
8,868,803 B2 10/2014 Bremer et al.
8,870,074 B1 10/2014 Gannon
8,879,639 B2 11/2014 Sauerwein
8,880,426 B2 11/2014 Smith
8,881,983 B2 11/2014 Havens et al.
8,881,987 B2 11/2014 Wang
8,903,172 B2 12/2014 Smith
8,908,995 B2 12/2014 Benos et al.
8,910,870 B2 12/2014 Li et al.
8,910,875 B2 12/2014 Ren et al.
8,914,290 B2 12/2014 Hendrickson et al.
8,914,788 B2 12/2014 Pettinelli et al.
8,915,439 B2 12/2014 Feng et al.
8,915,444 B2 12/2014 Havens et al.
8,916,789 B2 12/2014 Woodburn
8,918,250 B2 12/2014 Hollifield
8,918,564 B2 12/2014 Caballero
8,925,818 B2 1/2015 Kosecki et al.
8,939,374 B2 1/2015 Jovanovski et al.
8,942,480 B2 1/2015 Ellis
8,944,313 B2 2/2015 Williams et al.
8,944,327 B2 2/2015 Meier et al.
8,944,332 B2 2/2015 Harding et al.
8,950,678 B2 2/2015 Germaine et al.
D723,560 S 3/2015 Zhou et al.
8,967,468 B2 3/2015 Gomez et al.
8,971,346 B2 3/2015 Sevier
8,976,030 B2 3/2015 Cunningham et al.
8,976,368 B2 3/2015 Akel et al.
8,978,981 B2 3/2015 Guan
8,978,983 B2 3/2015 Bremer et al.
8,978,984 B2 3/2015 Hennick et al.
8,985,456 B2 3/2015 Zhu et al.
8,985,457 B2 3/2015 Soule et al.
8,985,459 B2 3/2015 Kearney et al.
8,985,461 B2 3/2015 Gelay et al.
8,988,578 B2 3/2015 Showering
8,988,590 B2 3/2015 Gillet et al.
8,991,704 B2 3/2015 Hopper et al.
8,996,194 B2 3/2015 Davis et al.
8,996,384 B2 3/2015 Funyak et al.
8,998,091 B2 4/2015 Edmonds et al.
9,002,641 B2 4/2015 Showering
9,007,368 B2 4/2015 Laffargue et al.
9,010,641 B2 4/2015 Qu et al.
9,015,513 B2 4/2015 Murawski et al.
9,016,576 B2 4/2015 Brady et al.
D730,357 S 5/2015 Fitch et al.
9,022,288 B2 5/2015 Nahill et al.
9,030,964 B2 5/2015 Essinger et al.
9,033,240 B2 5/2015 Smith et al.
9,033,242 B2 5/2015 Gillet et al.
9,036,054 B2 5/2015 Koziol et al.
9,037,344 B2 5/2015 Chamberlin
9,038,911 B2 5/2015 Xian et al.
9,038,915 B2 5/2015 Smith
D730,901 S 6/2015 Oberpriller et al.
D730,902 S 6/2015 Fitch et al.
D733,112 S 6/2015 Chaney et al.
9,047,098 B2 6/2015 Barten
9,047,359 B2 6/2015 Caballero et al.
9,047,420 B2 6/2015 Caballero
9,047,525 B2 6/2015 Barber
9,047,531 B2 6/2015 Showering et al.
9,049,640 B2 6/2015 Wang et al.
9,053,055 B2 6/2015 Caballero
9,053,378 B1 6/2015 Hou et al.
9,053,380 B2 6/2015 Xian et al.
9,057,641 B2 6/2015 Amundsen et al.
9,058,526 B2 6/2015 Powilleit
9,064,165 B2 6/2015 Havens et al.
9,064,167 B2 6/2015 Xian et al.
9,064,168 B2 6/2015 Todeschini et al.
9,064,254 B2 6/2015 Todeschini et al.
9,066,032 B2 6/2015 Wang
9,070,032 B2 6/2015 Corcoran
D734,339 S 7/2015 Zhou et al.
D734,751 S 7/2015 Oberpriller et al.
9,082,023 B2 7/2015 Feng et al.
9,224,022 B2 12/2015 Ackley et al.
9,224,027 B2 12/2015 Van Horn et al.
D747,321 S 1/2016 London et al.
9,230,140 B1 1/2016 Ackley
9,250,712 B1 2/2016 Todeschini
9,258,033 B2 2/2016 Showering
9,262,633 B1 2/2016 Todeschini et al.
9,310,609 B2 4/2016 Rueblinger et al.
D757,009 S 5/2016 Oberpriller et al.
9,342,724 B2 5/2016 McCloskey
9,375,945 B1 6/2016 Bowles
D760,719 S 7/2016 Zhou et al.
9,390,596 B1 7/2016 Todeschini
D762,604 S 8/2016 Fitch et al.
D762,647 S 8/2016 Fitch et al.
9,412,242 B2 8/2016 Van Horn et al.
9,424,454 B2 8/2016 Tao et al.
D766,244 S 9/2016 Zhou et al.
9,443,123 B2 9/2016 Hejl
9,443,222 B2 9/2016 Singel et al.
9,478,113 B2 10/2016 Xie et al.
9,572,901 B2 2/2017 Todeschini
2001/0038547 A1 11/2001 Jigour et al.
2003/0029917 A1 2/2003 Hennick et al.
2003/0089776 A1 5/2003 Hennick et al.
2003/0222148 A1* 12/2003 Schmidt ............ G06K 7/10881 235/462.45
2004/0069855 A1 4/2004 Patel et al.
2004/0159703 A1 8/2004 Kogan et al.
2006/0202210 A1 9/2006 Mok et al.
2006/0274171 A1 12/2006 Wang
2007/0040034 A1* 2/2007 Hennick ........... G06K 7/10732 235/462.41
2007/0045422 A1 3/2007 Ito
2007/0063048 A1 3/2007 Havens et al.
2007/0085185 A1 4/2007 Vos
2008/0135728 A1 6/2008 Yang et al.
2008/0277473 A1* 11/2008 Kotlarsky .......... G06K 7/10722 235/462.07
2009/0059616 A1 3/2009 Wittenberg et al.
2009/0088203 A1 4/2009 Havens et al.
2009/0134221 A1 5/2009 Zhu et al.
2009/0242641 A1 10/2009 Blasczak
2009/0308926 A1* 12/2009 Canini ............... G06K 7/10722 235/454
2010/0177076 A1 7/2010 Essinger et al.
2010/0177080 A1 7/2010 Essinger et al.
2010/0177707 A1 7/2010 Essinger et al.
2010/0177749 A1 7/2010 Essinger et al.
2010/0219249 A1* 9/2010 Barkan ............. G06K 7/10732 235/462.42
2011/0169999 A1 7/2011 Grunow et al.
2011/0202554 A1 8/2011 Powilleit et al.
2011/0309151 A1 12/2011 Cudzilo
2012/0111946 A1 5/2012 Golant
2012/0168512 A1 7/2012 Kotlarsky et al.
2012/0193423 A1 8/2012 Samek
2012/0193429 A1 8/2012 Van Volkinburg et al.
2012/0193431 A1 8/2012 Hawley et al.
2012/0203647 A1 8/2012 Smith
2012/0223141 A1 9/2012 Good et al.
2013/0043312 A1 2/2013 Van Horn
2013/0044257 A1 2/2013 Chien et al.
2013/0075168 A1 3/2013 Amundsen et al.
2013/0175341 A1 7/2013 Kearney et al.
2013/0175343 A1 7/2013 Good
2013/0231157 A1 9/2013 Chung
2013/0238140 A1 9/2013 Malchiondo et al.
2013/0257744 A1 10/2013 Daghigh et al.
2013/0257759 A1 10/2013 Daghigh
2013/0270346 A1 10/2013 Xian et al.
2013/0287258 A1 10/2013 Kearney

(56) References Cited

U.S. PATENT DOCUMENTS

2013/0292475 A1 11/2013 Kotlarsky et al.
2013/0292477 A1 11/2013 Hennick et al.
2013/0293539 A1 11/2013 Hunt et al.
2013/0293540 A1 11/2013 Laffargue et al.
2013/0306728 A1 11/2013 Thuries et al.
2013/0306731 A1 11/2013 Pedraro
2013/0307964 A1 11/2013 Bremer et al.
2013/0308625 A1 11/2013 Corcoran
2013/0313324 A1 11/2013 Koziol et al.
2013/0313325 A1 11/2013 Wilz et al.
2013/0342717 A1 12/2013 Havens et al.
2014/0001267 A1 1/2014 Giordano et al.
2014/0002828 A1 1/2014 Laffargue et al.
2014/0008439 A1 1/2014 Wang
2014/0025584 A1 1/2014 Liu et al.
2014/0034734 A1 2/2014 Sauerwein
2014/0036848 A1 2/2014 Pease et al.
2014/0038222 A1 2/2014 Alt et al.
2014/0039693 A1 2/2014 Havens et al.
2014/0042814 A1 2/2014 Kather et al.
2014/0049120 A1 2/2014 Kohtz et al.
2014/0049635 A1 2/2014 Laffargue et al.
2014/0061306 A1 3/2014 Wu et al.
2014/0063289 A1 3/2014 Hussey et al.
2014/0066136 A1 3/2014 Sauerwein et al.
2014/0067692 A1 3/2014 Ye et al.
2014/0070005 A1 3/2014 Nahill et al.
2014/0071840 A1 3/2014 Venancio
2014/0074746 A1 3/2014 Wang
2014/0076974 A1 3/2014 Havens et al.
2014/0078341 A1 3/2014 Havens et al.
2014/0078342 A1 3/2014 Li et al.
2014/0078345 A1 3/2014 Showering
2014/0098792 A1 4/2014 Wang et al.
2014/0100774 A1 4/2014 Showering
2014/0100813 A1 4/2014 Showering
2014/0103115 A1 4/2014 Meier et al.
2014/0104413 A1 4/2014 McCloskey et al.
2014/0104414 A1 4/2014 McCloskey et al.
2014/0104416 A1 4/2014 Li et al.
2014/0104451 A1 4/2014 Todeschini et al.
2014/0106594 A1 4/2014 Skvoretz
2014/0106725 A1 4/2014 Sauerwein
2014/0108010 A1 4/2014 Maltseff et al.
2014/0108402 A1 4/2014 Gomez et al.
2014/0108682 A1 4/2014 Caballero
2014/0110485 A1 4/2014 Toa et al.
2014/0114530 A1 4/2014 Fitch et al.
2014/0121438 A1 5/2014 Kearney
2014/0121445 A1 5/2014 Ding et al.
2014/0124577 A1 5/2014 Wang et al.
2014/0124579 A1 5/2014 Ding
2014/0125842 A1 5/2014 Winegar
2014/0125853 A1 5/2014 Wang
2014/0125999 A1 5/2014 Longacre et al.
2014/0129378 A1 5/2014 Richardson
2014/0131438 A1 5/2014 Kearney
2014/0131441 A1 5/2014 Nahill et al.
2014/0131443 A1 5/2014 Smith
2014/0131444 A1 5/2014 Wang
2014/0131445 A1 5/2014 Ding et al.
2014/0131448 A1 5/2014 Xian et al.
2014/0133379 A1 5/2014 Wang et al.
2014/0136208 A1 5/2014 Maltseff et al.
2014/0140585 A1 5/2014 Wang
2014/0151453 A1 6/2014 Meier et al.
2014/0152882 A1 6/2014 Samek et al.
2014/0158770 A1 6/2014 Sevier et al.
2014/0159869 A1 6/2014 Zumsteg et al.
2014/0166755 A1 6/2014 Liu et al.
2014/0166757 A1 6/2014 Smith
2014/0166759 A1 6/2014 Liu et al.
2014/0168787 A1 6/2014 Wang et al.
2014/0175165 A1 6/2014 Havens et al.
2014/0175172 A1 6/2014 Jovanovski et al.
2014/0191644 A1 7/2014 Chaney
2014/0191913 A1 7/2014 Ge et al.
2014/0197238 A1 7/2014 Lui et al.
2014/0197239 A1 7/2014 Havens et al.
2014/0197304 A1 7/2014 Feng et al.
2014/0203087 A1 7/2014 Smith et al.
2014/0204268 A1 7/2014 Grunow et al.
2014/0214631 A1 7/2014 Hansen
2014/0217166 A1 8/2014 Berthiaume et al.
2014/0217180 A1 8/2014 Liu
2014/0231500 A1 8/2014 Ehrhart et al.
2014/0232930 A1 8/2014 Anderson
2014/0247315 A1 9/2014 Marty et al.
2014/0263493 A1 9/2014 Amurgis et al.
2014/0263645 A1 9/2014 Smith et al.
2014/0270196 A1 9/2014 Braho et al.
2014/0270229 A1 9/2014 Braho
2014/0278387 A1 9/2014 DiGregorio
2014/0282210 A1 9/2014 Bianconi
2014/0284384 A1 9/2014 Lu et al.
2014/0288933 A1 9/2014 Braho et al.
2014/0297058 A1 10/2014 Barker et al.
2014/0299665 A1 10/2014 Barber et al.
2014/0312121 A1 10/2014 Lu et al.
2014/0319220 A1 10/2014 Coyle
2014/0319221 A1 10/2014 Oberpriller et al.
2014/0326787 A1 11/2014 Barten
2014/0332590 A1 11/2014 Wang et al.
2014/0344943 A1 11/2014 Todeschini et al.
2014/0346233 A1 11/2014 Liu et al.
2014/0351317 A1 11/2014 Smith et al.
2014/0353373 A1 12/2014 Van Horn et al.
2014/0361073 A1 12/2014 Qu et al.
2014/0361082 A1 12/2014 Xian et al.
2014/0362184 A1 12/2014 Jovanovski et al.
2014/0363015 A1 12/2014 Braho
2014/0369511 A1 12/2014 Sheerin et al.
2014/0374483 A1 12/2014 Lu
2014/0374485 A1 12/2014 Xian et al.
2015/0001301 A1 1/2015 Ouyang
2015/0001304 A1 1/2015 Todeschini
2015/0003673 A1 1/2015 Fletcher
2015/0009338 A1 1/2015 Laffargue et al.
2015/0009610 A1 1/2015 London et al.
2015/0014416 A1 1/2015 Kotlarsky et al.
2015/0021397 A1 1/2015 Rueblinger et al.
2015/0028102 A1 1/2015 Ren et al.
2015/0028103 A1 1/2015 Jiang
2015/0028104 A1 1/2015 Ma et al.
2015/0029002 A1 1/2015 Yeakley et al.
2015/0032709 A1 1/2015 Maloy et al.
2015/0039309 A1 2/2015 Braho et al.
2015/0040378 A1 2/2015 Saber et al.
2015/0048168 A1 2/2015 Fritz et al.
2015/0049347 A1 2/2015 Laffargue et al.
2015/0051992 A1 2/2015 Smith
2015/0053766 A1 2/2015 Havens et al.
2015/0053768 A1 2/2015 Wang et al.
2015/0053769 A1 2/2015 Thuries et al.
2015/0062366 A1 3/2015 Liu et al.
2015/0063215 A1 3/2015 Wang
2015/0063676 A1 3/2015 Lloyd et al.
2015/0069130 A1 3/2015 Gannon
2015/0071818 A1 3/2015 Todeschini
2015/0083800 A1 3/2015 Li et al.
2015/0086114 A1 3/2015 Todeschini
2015/0088522 A1 3/2015 Hendrickson et al.
2015/0096872 A1 4/2015 Woodburn
2015/0099557 A1 4/2015 Pettineli et al.
2015/0100196 A1 4/2015 Hollifield
2015/0102109 A1 4/2015 Huck
2015/0115035 A1 4/2015 Meier et al.
2015/0127791 A1 5/2015 Kosecki et al.
2015/0128116 A1 5/2015 Chen et al.
2015/0129659 A1 5/2015 Feng et al.
2015/0133047 A1 5/2015 Smith et al.
2015/0134470 A1 5/2015 Hejl et al.
2015/0136851 A1 5/2015 Harding et al.
2015/0136854 A1 5/2015 Lu et al.

(56) References Cited

U.S. PATENT DOCUMENTS

| | | | |
|---|---|---|---|
| 2015/0142492 | A1 | 5/2015 | Kumar |
| 2015/0144692 | A1 | 5/2015 | Hejl |
| 2015/0144698 | A1 | 5/2015 | Teng et al. |
| 2015/0144701 | A1 | 5/2015 | Xian et al. |
| 2015/0149946 | A1 | 5/2015 | Benos et al. |
| 2015/0161429 | A1 | 6/2015 | Xian |
| 2015/0169925 | A1 | 6/2015 | Chang et al. |
| 2015/0169929 | A1 | 6/2015 | Williams et al. |
| 2015/0186703 | A1 | 7/2015 | Chen et al. |
| 2015/0193644 | A1 | 7/2015 | Kearney et al. |
| 2015/0193645 | A1 | 7/2015 | Colavito et al. |
| 2015/0199957 | A1 | 7/2015 | Funyak et al. |
| 2015/0204671 | A1 | 7/2015 | Showering |
| 2015/0210199 | A1 | 7/2015 | Payne |
| 2015/0220753 | A1 | 8/2015 | Zhu et al. |
| 2015/0254485 | A1 | 9/2015 | Feng et al. |
| 2015/0327012 | A1 | 11/2015 | Bian et al. |
| 2016/0014251 | A1 | 1/2016 | Hejl |
| 2016/0040982 | A1 | 2/2016 | Li et al. |
| 2016/0042241 | A1 | 2/2016 | Todeschini |
| 2016/0057230 | A1 | 2/2016 | Todeschini et al. |
| 2016/0109219 | A1 | 4/2016 | Ackley et al. |
| 2016/0109220 | A1 | 4/2016 | Laffargue |
| 2016/0109224 | A1 | 4/2016 | Thuries et al. |
| 2016/0112631 | A1 | 4/2016 | Ackley et al. |
| 2016/0112643 | A1 | 4/2016 | Laffargue et al. |
| 2016/0124516 | A1 | 5/2016 | Schoon et al. |
| 2016/0125217 | A1 | 5/2016 | Todeschini |
| 2016/0125342 | A1 | 5/2016 | Miller et al. |
| 2016/0133253 | A1 | 5/2016 | Braho et al. |
| 2016/0171720 | A1 | 6/2016 | Todeschini |
| 2016/0178479 | A1 | 6/2016 | Goldsmith |
| 2016/0180678 | A1 | 6/2016 | Ackley et al. |
| 2016/0189087 | A1 | 6/2016 | Morton et al. |
| 2016/0125873 | A1 | 7/2016 | Braho et al. |
| 2016/0227912 | A1 | 8/2016 | Oberpriller et al. |
| 2016/0232891 | A1 | 8/2016 | Pecorari |
| 2016/0292477 | A1 | 10/2016 | Bidwell |
| 2016/0294779 | A1 | 10/2016 | Yeakley et al. |
| 2016/0306769 | A1 | 10/2016 | Kohtz et al. |
| 2016/0314276 | A1 | 10/2016 | Sewell et al. |
| 2016/0314294 | A1 | 10/2016 | Kubler et al. |

FOREIGN PATENT DOCUMENTS

| | | | |
|---|---|---|---|
| CN | 101517733 | A | 8/2009 |
| CN | 102682264 | A | 9/2012 |
| CN | 103780847 | A | 5/2014 |
| EP | 2482226 | A2 | 8/2012 |
| WO | 2013163789 | A1 | 11/2013 |
| WO | 2013173985 | A1 | 11/2013 |
| WO | 2014019130 | A1 | 2/2014 |
| WO | 2014110495 | A1 | 7/2014 |

OTHER PUBLICATIONS

English-translation of First Office Action in related Chinese Application No. 201210411590.8 dated Sep. 4, 2017, pp. 1-11.

Second Office Action in related Chinese Application No. 201210411590.8 dated Feb. 26, 2018, pp. 1-9.

English-translation of Second Office Action in related Chinese Application No. 201210411590.8 dated Feb. 26, 2018, pp. 1-8.

U.S. Appl. for Multipurpose Optical Reader, filed May 14, 2014 (Jovanovski et al.); 59 pages., U.S. Appl. No. 14/277,337.

Search Report and Written Opinion in counterpart European Application No. 15156203.0 dated Jul. 8, 2015, pp. 1-7 [US Publication No. 2014/0001267 previously cited].

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

Advisory Action (PTOL-303) dated Dec. 9, 2015 for US Application No. 14062239.

Final Rejection dated Oct. 8, 2015 for US Application No. 14062239.

Non-Final Rejection dated Jun. 24, 2015 for US Application No. 14062239.

Notice of Allowance and Fees Due (PTOL-85) dated Apr. 15, 2016 for US Application No. 14062239.

* cited by examiner

CHIP ON BOARD BASED HIGHLY INTEGRATED IMAGER

CROSS-REFERENCE TO RELATED APPLICATIONS

The present application claims the benefit of U.S. patent application Ser. No. 14/062,239 for a Chip On Board Based Highly Integrated Imager filed Oct. 24, 2013 (and published Apr. 24, 2014 as U.S. Patent Publication No. 2014/0110485), now U.S. Pat. No. 9,424,454, which claims the benefit of Chinese Patent Application for Invention No. 201210411590.8 for a Chip On Board Based Highly Integrated Imager filed Oct. 24, 2012. Each of the foregoing patent applications, patent publication, and patent is hereby incorporated by reference in its entirety.

FIELD OF THE INVENTION

The present invention relates, in general, to decoding of bar code symbols, and is particularly related to an apparatus for use in decoding a bar code symbol with multiple elements mounted directly onto a printed circuit board.

BACKGROUND

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

SUMMARY

Figure 1:
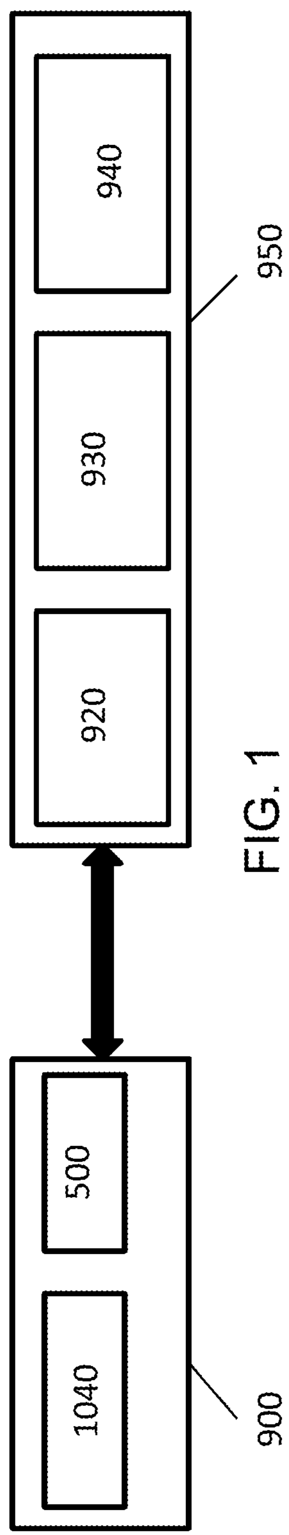
FIG. 1 is a block diagram of an apparatus for use in decoding a bar code symbol, the apparatus having an image sensor and LED dies mounted directly on a single printed circuit board, in accordance with an aspect of the invention.

According to one aspect, an invention for use in decoding a bar code symbol is provided. The apparatus may include an image sensor integrated circuit having a plurality of pixels arranged in a plurality of rows and columns of pixels, timing and control circuitry for controlling an image sensor, gain circuitry for controlling the gain of one or more signals, analog to digital conversion circuitry for conversion of an analog signal to a digital signal, and a plurality of electrode pads on a surface of the image sensor integrated circuit. The apparatus may also include a light source bank. Further, the apparatus may include a single printed circuit board for receiving the image sensor integrated circuit and the light source bank and including a plurality of contact pads disposed on a surface of the printed circuit board. The image sensor integrated circuit may be mounted directly on the single printed circuit board and then wire bonded directly to the printed circuit board to provide electrical input/output and mechanical connections between the image sensor integrated circuit and the printed circuit board. The light source bank may be mounted directly on the single printed circuit board and then wire bonded directly to the printed circuit board to provide electrical input/output and mechanical connections between the light source bank and the printed circuit board. The apparatus may be operative for processing image signals generated by the image sensor integrated circuit for attempting to decode the bar code symbol.

According to alternative aspects, the apparatus may further comprise a hand held housing encapsulating the image sensor integrated circuit and the light source bank. In one aspect, the light source bank may be an LED die. In a further aspect, light source bank circuitry may be mounted directly to the single printed circuit board and wire bonded directly to the printed circuit board. In another aspect, a processor circuitry may be mounted directly to the single printed circuit board and wire bonded directly to the printed circuit board. In another aspect, the apparatus may include an aimer light source bank positioned on the printed circuit board. The aimer light source bank may be an LED die. The apparatus may include an aimer subsystem electrically connected to the printed circuit board. In another aspect, the processing of image signals generated by the image sensor integrated circuit for attempting to decode the bar code symbol may be performed within the housing. In another aspect, the processing of the image signal generated by the image sensor integrated circuit for attempting to decode the bar code symbol is performed by circuitry external to the housing. In another aspect, the processing of image signals generated by the image sensor integrated circuit for attempting to decode the bar code symbol may be performed by a circuit disposed on the printed circuit board. In an alternative aspect, the processing of image signals generated by the image sensor integrated circuit for attempting to decode the bar code symbol may be performed by a computer external to the housing.

DETAILED DESCRIPTION

In traditional applications, barcode engines and other scanning devices have typically been disposed on multiple Printed Circuit Boards (PCBs). Multiple PCBs have been required because image based barcode scanners required a large number of component parts, including, but not limited to, an image sensor, a lens assembly, an illumination light source, an aimer light source a microcontroller, processor, RAM, and/or flash memory some of which were large and/or bulky. Where additional PCBs are used, the costs and the risk of product failure due to potential connection problems between PCBs increase. In addition, traditional applications have constraints or limitations on the size of the PCBs.

According to the present invention, more than one of the components for an imaging based barcode scanner engine may be mounted directly on a common PCB. The placement of component parts on a common PCB reduces the overall cost and risk of failure of the imaging based barcode scanner engine. In various embodiments, an image sensor integrated circuit including, for example, a camera module, an illumination light source, and/or an aimer light source may all be mounted on a single PCB with a light source bank. If desired, additional elements may be mounted directly on the common PCB.

Figure 2:
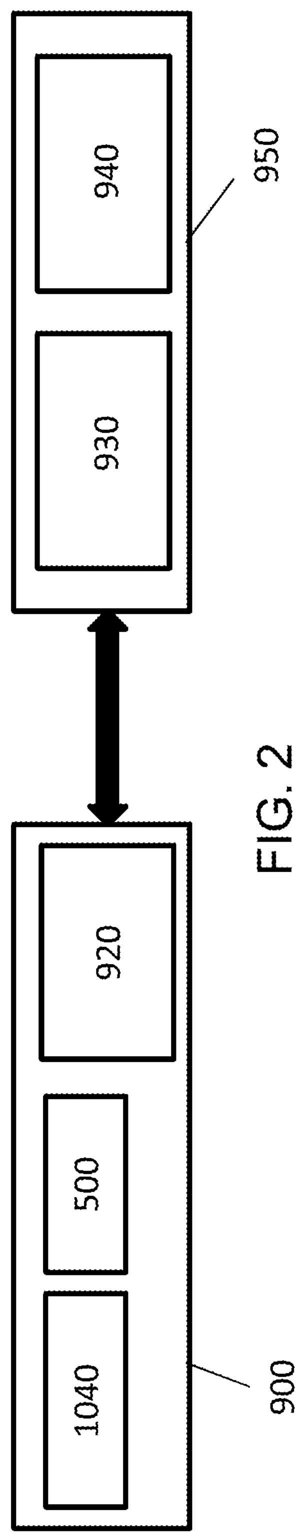
FIG. 2 is a block diagram of an apparatus for use in decoding a bar code symbol, the apparatus having an image sensor, LED dies, and LED drive circuitry mounted directly on a single printed circuit board, in accordance with an aspect of the invention.
Figure 3:
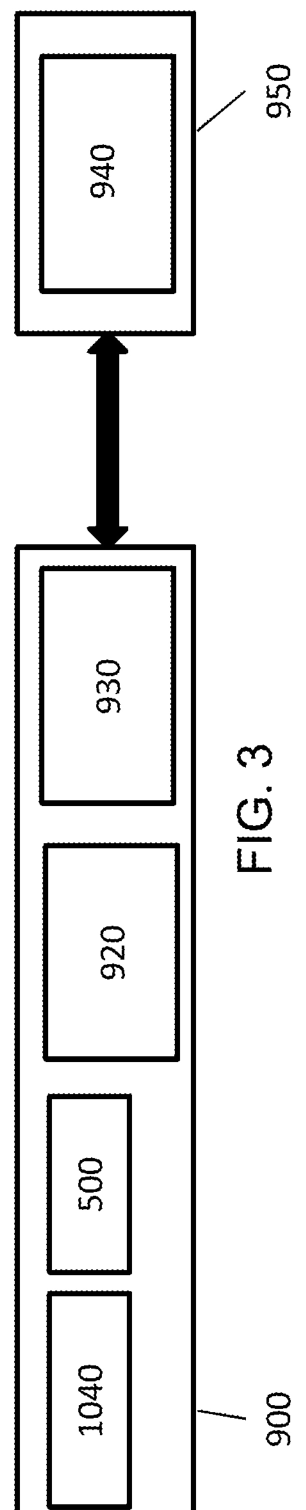
FIG. 3 is a block diagram of an apparatus for use in decoding a bar code symbol, the apparatus having an image sensor, LED dies, LED drive circuitry, and processor circuitry mounted directly on a single printed circuit board, in accordance with an aspect of the invention.

Referring now to FIG. 1, an apparatus 1000 for use in decoding a bar code symbol is shown and described. The apparatus 1000 including an image sensor 1040 and a light source bank 500 mounted directly on a common printed circuit board 910. The image sensor 1040 and light source bank 500 are described in greater detail below. Other packaged components, such as a light source bank driver circuitry 920, processor circuitry 930, and additional circuitry 940 may be disposed on a second circuit board 950 that is connected to the common printed circuit board 910. As illustrated in FIG. 2, the light source bank driver circuitry 920 may also be mounted directly on the common printed circuit board 910 with the image sensor 1040 and the light source bank 500. In this embodiment the processor circuitry 930 and additional circuitry 940 may be disposed on a second circuit board 950 that is connected to the common printed circuit board 910. FIG. 3 depicts a further embodiment, wherein the processor circuitry 930 is also mounted directly on the common printed circuit board 910 with the image sensor 1040, the light source bank 500, and the light source bank driver circuitry 920. The additional circuitry 940 may be disposed on a second circuit board 950 that is connected to the common printed circuit board 910 in the present embodiment.

Figure 4:
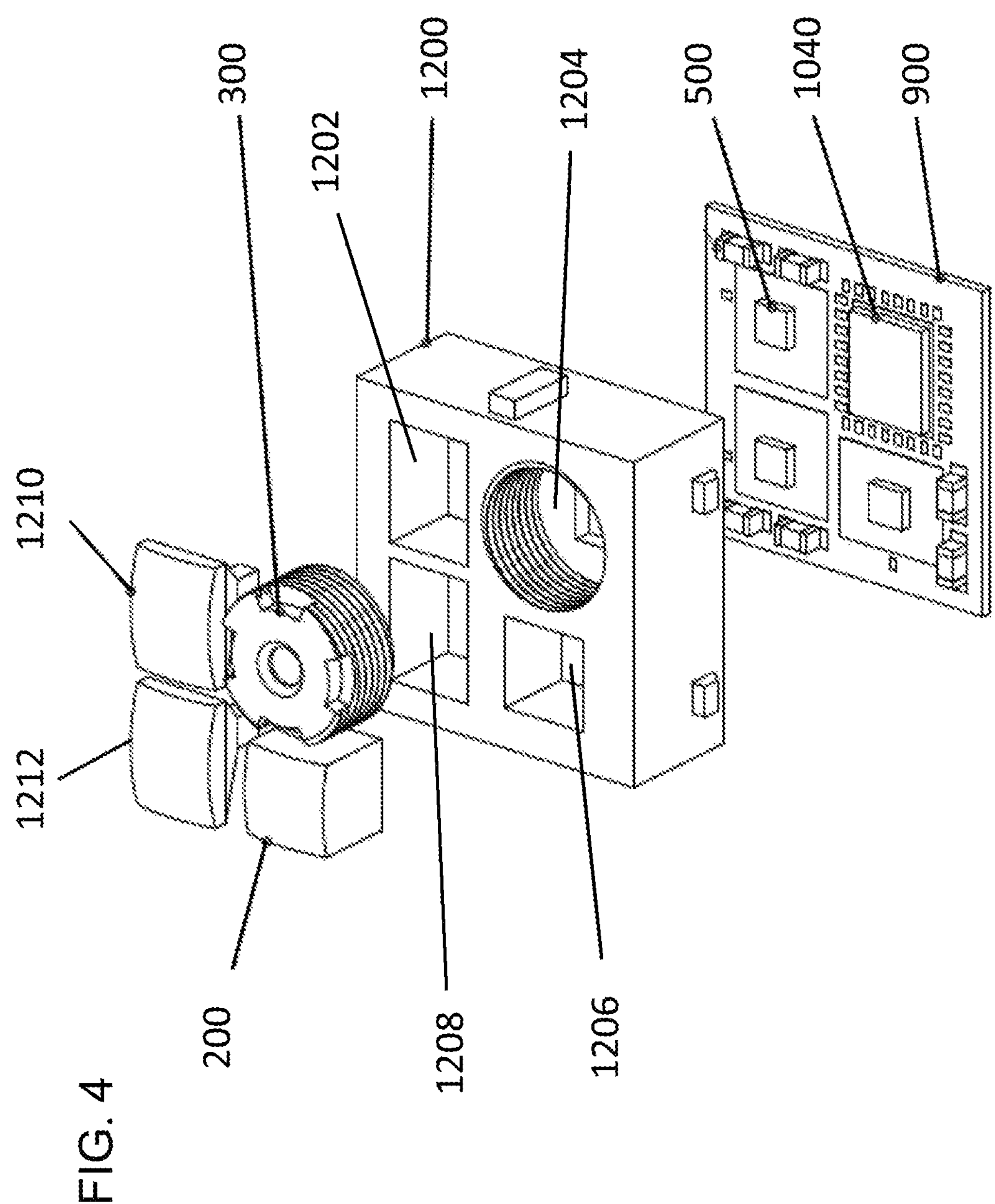
FIG. 4 is an exploded perspective view of an apparatus for use in decoding a bar code symbol, in accordance with an aspect of the invention.

The printed circuit board 910 including the image sensor 1040 and the light source bank 500 mounted directly to the printed circuit board 910 is depicted in FIG. 4. As illustrated the image sensor 1040 and the light source bank 500 are mounted directly onto the printed circuit board 910 along with additional components. A housing 1200 that may be secured over the printed circuit board 910 and the housing including a first opening 1202, a second opening 1204, a third opening 1206, and a fourth opening 1208. When the housing 1200 is mounted onto the printed circuit board 910 the first opening 1202 aligns with the light source bank 500 and the second opening 1204 aligns with the image sensor 1040. Further, the third and fourth openings 1206 and 1208 align with the components directly under the openings 1206 and 1208. A light pipe 1210 may be secured within the opening 1202 enabling light to pass into and out of the housing 1200 from the light source bank 500 as needed by the apparatus 1000. An illumination lens assembly 300 may be secured within the opening 1204 enabling the lens assembly 300 to transfer data between a target and the image sensor 1040. A lens assembly 200 may be secured within the opening 1206 to interact with the image sensor 1040 and providing the image sensor 1040 the ability to focus an image. A second light pipe 1212 may be secured in opening 1208 enabling light to pass into and out of the housing 1200 as needed by components mounted directly onto the printed circuit board 910 of the apparatus 1000.

An exemplary hardware platform for support of operations described herein with reference to apparatus 1000 for use in decoding a bar code symbol is shown and described with reference to FIG. 5.

Bar code decoding apparatus 1000 may include a housing 1014. Apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier or gain circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging subsystem of apparatus 1000 can include image sensor 1032 and a lens assembly 200 for focusing an image onto image sensor array 1033 of image sensor 1032.

In the course of operation of apparatus 1000, image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, imaging lens assembly 200 can be adapted for focusing an image of a decodable indicia 15 located within a field of view 1240 on a substrate, T, onto image sensor array 1033. A size in target space of a field of view 1240 of apparatus 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Apparatus 1000 can include an illumination subsystem 800 for illumination of target, T, and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. The apparatus 100 may be configured so that the light from light source bank 500 is directed toward a field of view 1240. Thus in various embodiments, light source bank 500 may be configured such that is affixed to the apparatus 1000, while in other embodiments light source bank 500 may be remote and direct light toward apparatus 1000 or field of view 1240.

An imaging module 900 can be provided having a circuit board carrying image sensor 1032 and lens assembly 200 disposed in a support on a circuit board. The illumination subsystem 800 may have a light source bank 500 provided by single light source. The single light source may be, for example purposes, an LED die. In another embodiment, light source bank 500 can be provided by more than one light source for example, more than one LED die. Apparatus 1000 can be adapted so that light from each of a one or more light source of light source bank 500 is directed toward field of view 1240 and utilized for projection of illumination pattern 1240. Referring again to FIG. 5, apparatus 1000 can also include an aiming subsystem 600 for projecting an aiming pattern 1242. Aiming subsystem 600 which can comprise a light source bank can be coupled to aiming light source bank power input unit 1208 for providing electrical power to a light source bank of aiming subsystem 600. The aiming light source bank may be, for example, one or more light source. Apparatus 1000 can be adapted so that light from one or more light source of aiming light source 600 is directed toward field of view 1240 and is utilized for projection of aiming pattern 1242. Power input unit 1208 can be coupled to system bus 1500 via interface 1108 for communication with CPU 1060.

Figure 5:
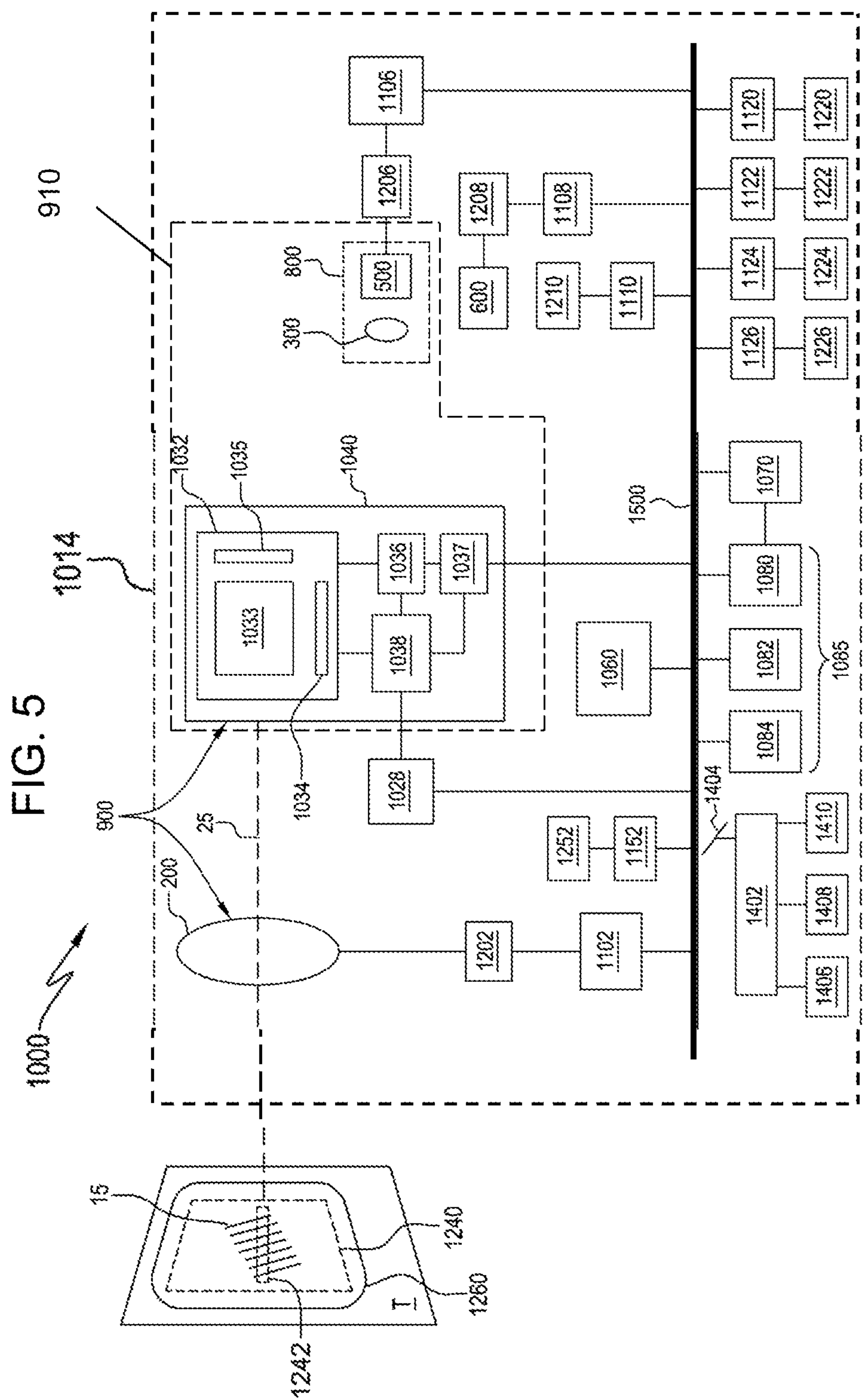
FIG. 5 is a block diagram of an apparatus for use in decoding a bar code symbol, the apparatus having multiple elements mounted directly on a single printed circuit board, in accordance with an aspect of the invention.

In one embodiment, illumination subsystem 800 can include, in addition to light source bank 500, an illumination lens assembly 300, as is shown in the embodiment of FIG. 5. In addition to or in place of illumination lens assembly 300 illumination subsystem 800 can include alternative light shaping optics, e.g. one or more diffusers, mirrors and prisms. In use, apparatus 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIG. 5, decodable indicia 15 is provided by a 1D bar code symbol. Decodable indicia 15 could also be provided by a 2D bar code symbol or optical character recognition (OCR) characters. Referring to further aspects of apparatus 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410).

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated in an integrated circuit disposed on circuit board.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Apparatus 1000 can also include a keyboard 1226 coupled to system bus 1500 via interface 1126. Various interface circuits of apparatus 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls. Apparatus 1000 may include a network communication interface 1252 coupled to system bus 1500 and in communication with CPU 1060, via interface 1152. Network communication interface 1252 may be configured to communicate with an external computer through a network.

A succession of frames of image data that can be captured and subject to the described processing can be full frames (including pixel values corresponding to each pixel of image sensor array 1033 or a maximum number of pixels read out from image sensor array 1033 during operation of apparatus 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 1000 can be increased (and frame time decreased) by decreasing of a frame picture size.

Figure 6:
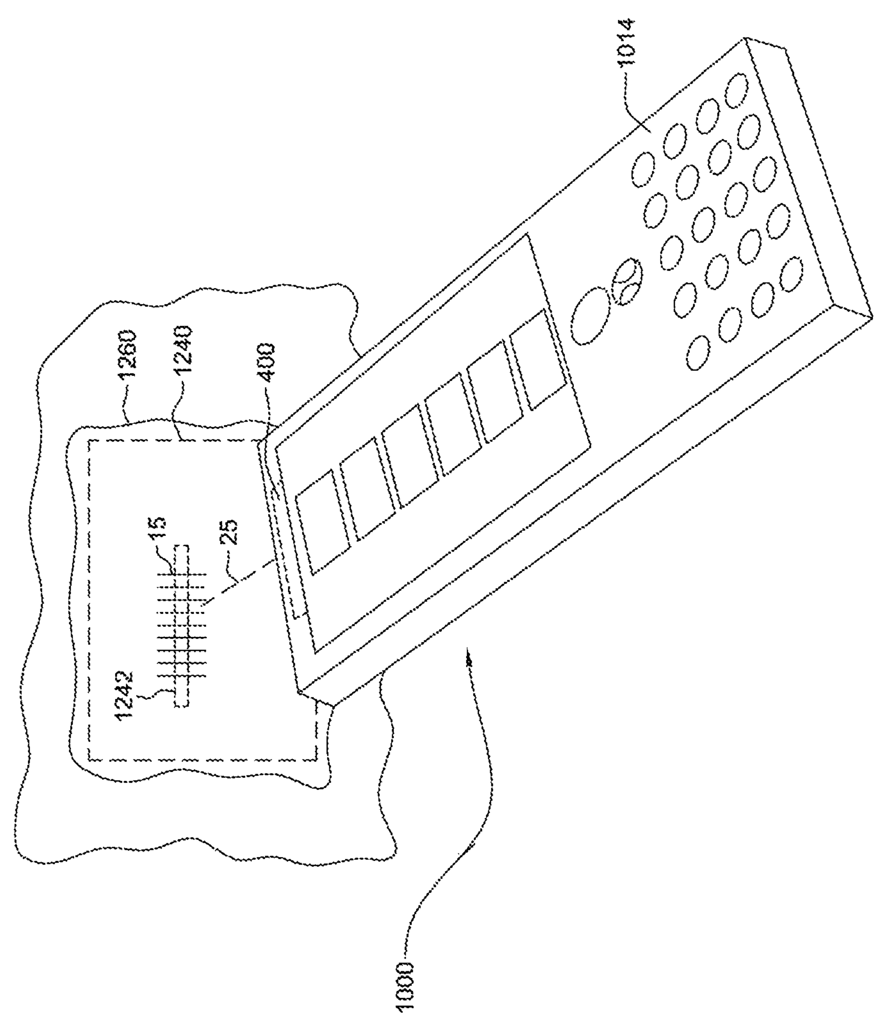
FIG. 6 is a perspective view of an apparatus for use in decoding a bar code symbol, in accordance with an aspect of the invention.

Referring now to FIG. 6, an example apparatus 1000 is shown. Specifically, apparatus 1000 may have a housing 1014, which as shown in FIG. 6, may be a hand held housing. Housing 1014 is configured to encapsulate image sensor integrated circuit 1040 (shown in FIG. 4). A microprocessor integrated circuit having a CPU for attempting to decode decodable indicia can be disposed on circuit board. Such microprocessor integrated circuit may be disposed externally to the circuit board, for example, on a circuit board external to circuit board within housing 1014. In another embodiment, apparatus 1000 may include CPU 1060, memory 1085, and network communication interface 1252 comprising a first computer housed within housing 1014 (shown in FIG. 5), and a second computer 6000 external to housing 1014, having a CPU 6010, memory 6020, and a network communication interface 6030. Image data can be transmitted to the second computer 6000 for processing by the CPU 6010 for attempting to decode decodable indicia.

A small sample of systems, methods, and apparatus that are described herein is as follows:

A1. An apparatus for use in decoding a bar code symbol, the apparatus comprising:

an image sensor integrated circuit, the image sensor integrated circuit having a plurality of pixels arranged in a plurality of rows and columns of pixels, timing and control circuitry for controlling an image sensor, gain circuitry for controlling the gain of one or more signals, analog to digital conversion circuitry for conversion of an analog signal to a digital signal, and a plurality of electrode pads on a surface of the image sensor integrated circuit;

a light source bank;

a single printed circuit board receiving the image sensor integrated circuit and the light source bank, the printed circuit board having a plurality of contact pads disposed on a surface of the printed circuit board;

wherein a connection between said image sensor integrated circuit and said printed circuit board is characterized by a plurality of wires connecting a plurality of bond pads on the image sensor to the plurality of contact pads on the printed circuit board, the wires, bond pads, and contact pads providing electrical input/output and mechanical connections between said image sensor integrated circuit and said printed circuit board; and wherein a connection between said light source bank and said printed circuit board is characterized by a plurality of wires connecting a plurality of bond pads on the light source bank to a plurality of bond pads on the printed circuit board, the wires and bond pads providing electrical input/output and mechanical connections between said light source bank and said printed circuit board.

A2. The apparatus of A1, wherein the apparatus is operative for processing of image signals generated by the image sensor integrated circuit for attempting to decode the bar code symbol.

A3. The apparatus of A1, further comprising:

a hand held housing encapsulating the image sensor integrated circuit and the light source bank.

A4. The apparatus of A3, wherein the processing of image signals generated by the image sensor integrated circuit for attempting to decode the bar code symbol is performed within the housing.

A5. The apparatus of A3, wherein the processing of image signals generated by the image sensor integrated circuit for attempting to decode the bar code symbol is performed by circuitry external to the housing.

A6. The apparatus of A1, wherein the processing of image signals generated by the image sensor integrated circuit for attempting to decode the bar code symbol is performed by a circuit disposed on said printed circuit board.

A7. The apparatus of A1, wherein the processing of image signals generated by the image sensor integrated circuit for attempting to decode the bar code symbol is performed by a computer external to the housing.

A8. The apparatus of A1 wherein the light source bank is an LED die.

A9. The apparatus of A1, further comprising:

a light source bank circuitry for controlling the operation of the light source bank, the light source bank electrically connected to the light source bank circuitry; and wherein a connection between the light source bank driver circuitry and said printed circuit board is characterized by a plurality of wires connecting a plurality of bond pads on the light source bank driver circuitry to the plurality of contact pads on the printed circuit board, the wires, bond pads, and contact pads providing electrical input/output and mechanical connections between said image sensor integrated circuit and said printed circuit board.

A10. The apparatus of A9, further comprising:

a processor circuitry; and wherein a connection between the processor circuitry and said printed circuit board is characterized by a plurality of wires connecting a plurality of bond pads on the processor circuitry to the plurality of contact pads on the printed circuit board, the wires, bond pads, and contact pads providing electrical input/output and mechanical connections between said images sensor integrated circuit and said printed circuit board.

A11. The apparatus of A1, further comprising:

an aimer light source bank positioned on said printed circuit board.

A12. The apparatus of A11, wherein the aimer source bank is an LED die.

A13. The apparatus of A1, further comprising:

an aimer subsystem and an aimer light circuitry for controlling the operation of an aimer light bank, the aimer light bank electrically connected to the aimer light circuitry, and the aimer light circuitry electrically connected to said printed circuit board.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An apparatus for use in decoding a bar code symbol, the apparatus comprising:

a printed circuit board, comprising:

an image sensor integrated circuit mounted directly onto the printed circuit board to facilitate an electrical connection between the printed circuit board and the image sensor integrated circuit, the image sensor integrated circuit comprising an image sensor associated with a plurality of pixels arranged in a plurality of rows and columns of pixels, timing and control circuitry configured to control the image sensor, gain circuitry configured to control gain of one or more analog signals associated with the image sensor, and an analog to digital converter configured to convert the one or more analog signals into one or more digital signals associated with the image sensor; and an illumination subsystem comprising a light source bank mounted directly onto the printed circuit board to facilitate an electrical connection between the printed circuit board and the illumination subsystem, wherein the light source bank comprises a plurality of LED dies.

2. The apparatus of claim 1, wherein the illumination subsystem comprises an illumination lens assembly.

3. The apparatus of claim 1, wherein illumination subsystem comprises a diffuser, a mirror, and/or a prism.

4. The apparatus of claim 1, wherein the light source bank comprises one or more light sources configured to direct light toward a field of view of the image sensor integrated circuit.

5. The apparatus of claim 1, further comprising:

an illumination lens assembly; and an electrical power input unit configured to change a plane of optimum focus of the illumination lens assembly based on one or more electrical signals.

6. The apparatus of claim 1, further comprising a light source bank electrical power input unit configured to change a level of illumination output by the illumination subsystem.

7. The apparatus of claim 1, wherein the image sensor integrated circuit comprises a plurality of electrode pads on a surface of the image sensor integrated circuit, wherein a first plurality of wires connect the image sensor integrated circuit and the printed circuit board, wherein a second plurality of wires connect a first plurality of bond pads on the light source bank to a second plurality of bond pads on the printed circuit board, and wherein the second plurality of wires, the first plurality of bond pads and the second plurality of bond pads facilitate an electrical input/output connection and a mechanical connection between the light source bank and the printed circuit board.

8. An apparatus for use in decoding a bar code symbol, the apparatus comprising:

a printed circuit board, comprising:

an image sensor integrated circuit mounted directly onto the printed circuit board to facilitate an electrical connection between the printed circuit board and the image sensor integrated circuit, the image sensor integrated circuit comprising an image sensor, timing and control circuitry configured to control the image sensor, gain circuitry configured to control gain of one or more analog signals associated with the image sensor, and an analog to digital converter configured to convert the one or more analog signals into one or more digital signals associated with the image sensor; and an illumination subsystem comprising a light source bank mounted directly onto the printed circuit board to facilitate an electrical connection between the printed circuit board and the illumination subsystem, wherein the light source bank comprises a plurality of LED dies.

9. The apparatus of claim 8, wherein the illumination subsystem comprises an illumination lens assembly.

10. The apparatus of claim 8, wherein illumination subsystem comprises a diffuser, a mirror, and/or a prism.

11. The apparatus of claim 8, wherein the light source bank comprises one or more light sources configured to direct light toward a field of view of the image sensor integrated circuit.

12. The apparatus of claim 8, further comprising:

an illumination lens assembly; and an electrical power input unit configured to change a plane of optimum focus of the illumination lens assembly based on one or more electrical signals.

13. The apparatus of claim 8, further comprising a light source bank electrical power input unit configured to change a level of illumination output by the illumination subsystem.

14. An apparatus for use in decoding a bar code symbol, the apparatus comprising:

a printed circuit board, comprising:

an image sensor integrated circuit mounted directly onto the printed circuit board to facilitate an electrical connection between the printed circuit board and the image sensor integrated circuit, the image sensor integrated circuit comprising an image sensor associated with a plurality of pixels arranged in a plurality of rows and columns of pixels, timing and control circuitry configured to control the image sensor, gain circuitry configured to control gain of one or more analog signals associated with the image sensor, and analog to digital conversion circuitry configured to convert the one or more analog signals into one or more digital signals associated with the image sensor; and an illumination subsystem comprising a light source bank mounted directly onto the printed circuit board to facilitate an electrical connection between the printed circuit board and the illumination subsystem, wherein the light source bank comprises a plurality of LED dies.

15. The apparatus of claim 14, wherein the printed circuit board comprises a plurality of wires that connect a plurality of bond pads on the image sensor to a plurality of contact pads on the printed circuit board, and wherein the plurality of wires, the plurality of bond pads, and the plurality of contact pads provide electrical input/output and mechanical connections between the image sensor integrated circuit and the printed circuit board.

16. The apparatus of claim 14, wherein the apparatus is configured to process one or more image signals generated by the image sensor integrated circuit to decode the bar code symbol.

17. The apparatus of claim 14, further comprising a hand-held housing that encapsulates the image sensor integrated circuit and the illumination subsystem.

18. The apparatus of claim 14, wherein the apparatus is configured to process one or more image signals generated by the image sensor integrated circuit to decode the bar code symbol, and wherein a housing encapsulates the image sensor integrated circuit and the illumination subsystem.

19. The apparatus of claim 14, wherein circuitry external to a housing that encapsulates the image sensor integrated circuit and the illumination subsystem is configured to process one or more images signals to decode the barcode symbol.

20. The apparatus of claim 14, wherein the printed circuit board further comprises circuitry configured to process one or more image signals generated by the image sensor integrated circuit to decode the bar code symbol, and wherein the circuit is mounted directly onto the printed circuit board.

* * * * *